United States Patent [19]

Aydin et al.

[11] Patent Number: 5,534,571
[45] Date of Patent: Jul. 9, 1996

[54] PREPARATION OF SOLVENT-FREE AQUEOUS POLYMER AND TACKIFIER DISPERSIONS

[75] Inventors: Oral Aydin, Mannheim; Hubertus Kröner, Ludwigshafen; Eckehardt Wistuba, Bad Durkheim; Peter Fickeisen, Dirmstein, all of Germany

[73] Assignee: BASF Aktiengesellschaft, Ludwigshafen, Germany

[21] Appl. No.: 453,377

[22] Filed: May 30, 1995

Related U.S. Application Data

[63] Continuation of Ser. No. 216,304, Mar. 23, 1994, abandoned.

[30] Foreign Application Priority Data

Apr. 15, 1993 [DE] Germany .......................... 43 12 303.1

[51] Int. Cl.$^6$ ..................................................... C08L 93/04
[52] U.S. Cl. .......................... 524/272; 524/273; 524/274; 524/764; 523/334; 156/327
[58] Field of Search ................. 523/334; 524/272, 524/273, 274, 764; 156/327

[56] References Cited

U.S. PATENT DOCUMENTS

| | | | |
|---|---|---|---|
| 4,018,732 | 4/1977 | Lakshmanan | 524/272 |
| 4,189,419 | 2/1980 | Takemoto et al. | 524/272 |
| 4,665,107 | 5/1987 | Micale | 523/335 |
| 4,714,727 | 12/1987 | Hume, III | 524/272 |
| 5,319,019 | 6/1994 | Nothnagel | 524/556 |
| 5,438,087 | 8/1995 | Ikeda et al. | 524/272 |

FOREIGN PATENT DOCUMENTS

| | | | |
|---|---|---|---|
| 0152087 | 8/1985 | European Pat. Off. . | |
| 0167389 | 1/1986 | European Pat. Off. . | |
| 0326530 | 8/1989 | European Pat. Off. | 524/272 |
| 0260708 | 10/1988 | Germany | 524/272 |
| 4007637 | 9/1991 | Germany | 524/272 |
| 9112290 | 8/1991 | WIPO | 524/272 |

*Primary Examiner*—Paul R. Michl
*Assistant Examiner*—Andrew E. C. Merriam
*Attorney, Agent, or Firm*—Oblon, Spivak, McClelland, Maier & Neustadt

[57] ABSTRACT

Aqueous dispersions which contain a synthetic polymer obtained by free radical polymerization and a rosin are prepared by a process in which an aqueous dispersion of the synthetic polymer obtained by free radical polymerization is mixed with an aqueous formulation of a rosin which contains from 0.1 to 0.5 mol, based on 100 g of rosin, of carboxyl groups.

11 Claims, No Drawings

PREPARATION OF SOLVENT-FREE AQUEOUS POLYMER AND TACKIFIER DISPERSIONS

This application is a continuation of application Ser. No. 08/216,304, filed Mar. 23, 1994, now abandoned.

The present application relates to a process for the preparation of aqueous dispersions which are suitable for use as adhesives, in particular as contact adhesives and floor adhesives.

In order to avoid solvent wastes and solvent emissions, aqueous dispersions are increasingly being used as adhesives. Suitable aqueous dispersions, as described, for example, in EP-A-221 461, contain not only a synthetic polymer obtained by free radical polymerization but usually also tackifiers.

In general, these tackifiers are rosins. According to EP-A-221 461, the tackifier is added in the form of an organic solution to the aqueous dispersion of the polymer so that the solvent content of the resulting dispersion is usually still above 3% by weight.

According to the process of EP-A-490 191, the tackifier is dissolved in a plasticizer and then added to the dispersion. The organic plasticizer too then remains in the aqueous dispersion.

In other processes, the tackifier is dispersed in water with the aid of an emulsifier, a dispersant or a protective colloid. The presence of the hydrophilic assistant has an adverse effect on the performance characteristics.

Conventional aqueous dispersions which are used as adhesives generally have unsatisfactory grip. In the case of good grip, the adhesive bond has sufficient strength shortly after the parts to be adhesively bonded are brought together, so that unintentional displacement of the adhesively bonded parts generally does not occur.

It is an object of the present invention to provide a process for the preparation of aqueous dispersions which contain not only the polymer prepared by free radical polymerization but also a rosin, in which essentially no organic solvent or plasticizer is used. Furthermore, the aqueous dispersions obtained should have good grip when used as an adhesive.

We have found that this object is achieved by a process for the preparation of aqueous dispersions which contain a synthetic polymer obtained by free radical polymerization and a rosin, wherein an aqueous dispersion of the synthetic polymer obtained by free radical polymerization is mixed with an aqueous formulation of a rosin which contains from 0.1 to 0.5 mol of carboxylic groups, based on 100 g of rosin. We have also found aqueous dispersions prepared by this process and the use of the aqueous dispersions as adhesives, in particular as contact adhesives and floor adhesives.

The synthetic polymer obtained by free radical polymerization preferably contains at least 40, particularly preferably at least 60, % by weight of $C_1$–$C_{20}$-alkyl (meth) acrylates, vinyl esters of carboxylic acids of up to 20 carbon atoms, vinyl aromatics of up to 20 carbon atoms, ethylenically unsaturated nitriles of 3 to 6 carbon atoms, vinyl halides and nonaromatic hydrocarbons having at least two conjugated double bonds and 4 to 8 carbon atoms or mixtures thereof, which are referred to below as main monomers.

Examples of main monomers are in particular alkyl (meth) acrylates having a $C_1$–$C_{10}$-alkyl radical, such as methyl methacrylate, methyl acrylate, n-butyl acrylate, ethyl acrylate and 2-ethylhexyl acrylate.

Vinyl esters of carboxylic acids of 1 to 20 carbon atoms are, for example, vinyl laurate, vinyl stearate, vinyl propionate and particularly preferably vinyl acetate.

Suitable vinyl aromatic compounds are vinyltoluene, α- and p-styrene, α-butylstyrene, 4-n-butylstyrene, 4-n-decylstyrene and preferably styrene. Examples of nitriles are acrylonitrile and methacrylonitrile.

The vinyl halides are ethylenically unsaturated compounds substituted by chlorine, fluorine or bromine, preferably vinyl chloride and vinylidene chloride.

Examples of nonaromatic hydrocarbons having 2 to 8 carbon atoms and at least two olefinic double bonds are butadiene, isoprene and chloroprene. Butadiene is preferred.

Particularly preferred polymers are those which contain at least 40, in particular at least 60, % by weight of i) $C_1$–$C_{20}$-alkyl (meth) acrylates or mixtures thereof with vinyl aromatics, or ii) diolefins of 2 to 8 carbon atoms, in particular butadiene, or mixtures thereof with vinyl aromatics, or iii) vinyl esters of carboxylic acids of 1 to 20 carbon atoms.

Polymers having main monomers stated under i) are very particularly preferred.

Further monomers which may be present in the copolymer are, for example, esters of acrylic and methacrylic acid with alcohols of 1 to 20 carbon atoms which contain at least one further hetero atom in addition to the oxygen atom in the alcohol group and/or which contain an aliphatic or aromatic ring, such as 2-ethoxyethyl acrylate, 2-butoxyethyl (meth) acrylate, dimethylaminoethyl (meth) acrylate, diethylaminoethyl (meth) acrylate, aryl (meth) acrylates, alkylaryl (meth) acrylates or cycloalkyl (meth) acrylates, such as cyclohexyl (meth)acrylate, phenylethyl (meth) acrylate or phenylpropyl (meth) acrylate, or acrylates of heterocyclic alcohols, such as furfuryl (meth) acrylate.

Further monomers, such as (meth) acrylamide and its derivatives substituted at the nitrogen by $C_1$–$C_4$-alkyl, and glycidyl (meth) acrylate, are also suitable.

Monomers having hydroxyl functional groups, for example $C_1$–$C_{15}$-alkyl (meth) acrylates which are substituted by one or two hydroxyl groups, are also important. Particularly important comonomers having hydroxyl functional groups are $C_1$–$C_8$-hydroxyalkyl (meth) acrylate, such as n-hydroxyethyl, n-hydroxypropyl or n-hydroxybutyl (meth) acrylate.

Monomers having salt-forming groups, in particular acid groups, are also preferably present in the polymer. For example, acrylic acid, methacrylic acid, itaconic acid, fumaric acid, maleic acid or half-esters thereof are suitable.

The amount by weight of the monomers having salt-forming groups is in general from 0 to 10, in particular from 0.1 to 5, % by weight, based on the polymer.

The amount by weight of the abovementioned further monomers should be chosen so that the percentages by weight sum to 100 when the amount by weight of the main monomers and, where relevant, of the monomers having salt-forming groups is taken into account.

The monomers are preferably chosen so that the glass transition temperature of the polymer is from −80° C. to +120° C., preferably from −60° C. to +100° C.

In the case of use as an adhesive, the glass transition temperature is preferably from −60° C. to +20° C.

The glass transition temperature of the polymer can be determined by conventional methods, such as differential thermal analysis or differential scanning calorimetry (cf. ASTM 3418/82, ie. midpoint temperature).

The polymer is prepared by free radical polymerization. Suitable polymerization methods, such as mass, solution, suspension or emulsion polymerization, are known to the skilled worker.

The copolymer is preferably prepared by solution polymerization with subsequent dispersing in water or particularly preferably by emulsion polymerization.

In the emulsion polymerization, the monomers can be polymerized in the conventional manner in the presence of a water-soluble initiator and of an emulsifier at, preferably, from 30° to 95° C.

Examples of suitable initiators are sodium persulfate, potassium persulfate, ammonium persulfate, tert-butyl hydroperoxides, water-soluble azo compounds and also redox initiators.

The emulsifiers used are, for example, alkali metal salts of relatively long-chain fatty acids, alkylsulfates, alkylsulfonates, alkylated arylsulfonates or alkylated biphenyl ether sulfonates. Other suitable emulsifiers are reaction products of alkylene oxides, in particular of ethylene oxide or propylene oxide, with fatty alcohols, fatty acids or phenol or alkylphenols.

In the case of aqueous secondary dispersions, the copolymer is first prepared by solution polymerization in an organic solvent and then dispersed in water with the addition of salt formers, for example of ammonia to carboxyl-containing copolymers, without the use of an emulsifier or of a dispersant. The organic solvent can be distilled off. The preparation of aqueous secondary dispersions is known to the skilled worker and is described in, for example, DE-A-37 20 860.

Regulators may be used in the polymerization for establishing the molecular weight. For example, —SH—containing compounds, such as mercaptoethanol, mercaptopropanol, thiophenol, thioglycerol, ethyl thioglycolate, methyl thioglycolate and tert-dodecyl mercaptan, are suitable.

Aqueous dispersions of synthetic polymers obtained by free radical polymerization and having a high solids content, in particular above 50, preferably above 60, % by weight are preferred. The preparation of such dispersions is described in, for example, German Patent Applications P4213965.1 (O.Z. 43182), P4213964.3 (O.Z. 43183), P4213967.8 (O.Z. 43184), P4213968.6 (O.Z. 43185) and P4213969.4 (O.Z. 43186).

In the novel process, the aqueous dispersion of a synthetic polymer obtained by free radical polymerization is mixed with an aqueous formulation of a rosin.

Rosins are natural resins which, depending on their origins, are also referred to, for example, as gum rosin, wood rosin or tall rosin. They consist essentially of rosin acids, such as abietic acid, neoabietic acid, hydrogenated and dehydrogenated abietic acid, palustric acid, pimaric acid and isopimaric acid. In the rosins, the resin acids may generally be present in chemically modified form; in particular, the resin acids may be polymerized and the major part of the acid groups may be esterified, in particular with monohydric to tetrahydric $C_1$–$C_{20}$-alkyl alcohols.

The rosins used according to the invention preferably have a molecular weight of from 250 to 5,000, particularly preferably from 300 to 1,000.

Furthermore, the rosins contain from 0.1 to 0.5, preferably from 0.15 to 0.4, particularly preferably from 0.2 to 0.35, tool, based on 100 g of rosin (solid), of (unesterified) carboxyl groups.

In the novel process, an aqueous formulation of the rosin is first prepared. For this purpose, the rosin can be suspended in water, in general by stirring. The solids content of the aqueous formulation is generally brought to 20–80% by weight.

To improve suspending, the rosin is preferably heated to above its melting point, in general to 50°–95° C., preferably 70°–90° C. The aqueous formulation obtained is then preferably kept at this temperature until it is mixed with the aqueous dispersion.

The aqueous formulation may also contain further additives. Preferably, it contains no emulsifiers, dispersants or protective colloids or other assistants capable of dispersing or emulsifying the rosins.

The aqueous formulation preferably contains no organic solvents or plasticizers. Solvents or plasticizers result in the rosin dissolving completely or partly in the organic phase.

Some or all of the acid groups of the rosin are converted into salt groups before or during mixing with the aqueous dispersion. For this purpose, for example, a base, in particular ammonia, can be added as a neutralizer.

During the mixing process, the aqueous formulation of the rosin can be initially taken at from 30° to 95° C., preferably from 50° to 90° C. The dispersion of the synthetic polymer obtained by free radical polymerization is introduced into this formulation, preferably with stirring. The dispersion may be at from 10° to 95° C., preferably from 30° to 80° C. Usually, this introduction is effected a little at a time or continuously in the case of amounts in the kg range usually employed in the laboratory, preferably continuously in the case of larger amounts as are customary in production. In the case of continuous introduction, the dispersion is metered into the formulation in the course of from 5 minutes to 3 hours at a constant or variable metering rate. The temperature of the formulation may be constant or may change during the metering process. After the end of the metering process, stirring can be continued for from 0 to 3 hours.

Alternatively, the formulation may also be added to the dispersion by the method described above, but the dispersion is preferably introduced into the aqueous formulation of the rosin.

Mixing of the aqueous formulation of the rosin with the aqueous dispersion of the polymer gives an aqueous dispersion whose solids content is preferably from 30 to 80, particularly preferably from 60 to 80, % by weight, based on the dispersion. The pH of the resulting aqueous dispersion is preferably from 6 to 8.

The aqueous dispersion is essentially free of organic solvents or plasticizers. It possesses improved grip and is therefore particularly suitable as a contact adhesive or floor adhesive for the adhesive bonding of floor coverings.

For the various uses, the aqueous dispersion may contain conventional additives, such as fillers, thickeners, leveling agents, etc. These additives may be mixed with the prepared aqueous dispersion after the mixing process or may be mixed beforehand with the starting components.

EXAMPLES

The copolymer dispersions according to Table 1 were used as components of the mixture.

TABLE 1

| Dispersion | Monomer composition in % by weight | Solids content in % by weight |
| --- | --- | --- |
| D1 | 98% of n-butyl acrylate<br>2% of methacrylic acid | 70.9 |
| D2 | 88% of n-butyl acrylate<br>10% of methacrylate<br>2% of acrylic acid | 71.4 |
| D3 | 78% of n-butyl acrylate<br>14% of ethylhexyl acrylate<br>5% of vinyl acetate | 69.9 |

TABLE 1-continued

| Dispersion | Monomer composition in % by weight | Solids content in % by weight |
|---|---|---|
| D4 | 2.5% of methacrylic acid<br>0.5% of hydroxyethyl acrylate<br>78% of n-butyl acrylate<br>14% of ethylhexyl acrylate<br>5% of vinyl acetate<br>2.5% of methacrylic acid<br>0.5% of hydroxyethyl acrylate | 71.3 |

For the preparation of the aqueous formulation of the rosins, the amount of resin stated in Table 2, together with the amount of water stated in Table 2 and 25% strength ammonia water, was introduced into a stirred vessel, heated to 85° C. and stirred at this temperature for 15 minutes.

The amount of dispersion stated in Table 2 was then added to the aqueous formulations in the course of 60 minutes so that the temperature of the formulation did not fall below 80° C. Thereafter, the mixture was stirred for a further 15 minutes at 80° C. and then cooled while stirring.

TABLE 2

Mixtures

| Mixture No. | Rosin g | Water g | NH$_3$ hydrogen water g | Dispersion g | Solids content % | pH |
|---|---|---|---|---|---|---|
| A1 | Floral® AXE 100 g | 250 | 10 | D1 1056 g | 60.5 | 8.6 |
| A2 | Gum rosin 250 g | 300 | 15 | D2 1056 g | 60.9 | 7.8 |
| A3 | Gum rosin 300 g | 300 | 15 | D3 1000 g | 62.3 | 7.7 |
| A4 | Gum rosin 250 g | 280 | 12.5 | D3 1071 g | 61.8 | 7.7 |
| A5 | Gum rosin 100 g | 220 | 10 | D3 1286 g | 61.6 | 8.2 |
| A6 | Gum rosin 300 g | 300 | 15 | D4 1000 g | 62.3 | 7.7 |
| A7 | Gum rosin 250 g | 280 | 12.5 | D4 1071 g | 62.0 | 7.8 |
| A8 | Gum rosin 100 g | 220 | 10 | D4 1268 g | 61.0 | 8.3 |

Floral® AXE: Rosin from Hercules GmbH (content of carboxyl groups 0.30 mol/100 g)
Gum rosin: Portugese gum rosin WW, flakes, from Willers & Engels, Hamburg (content of carboxyl groups 0.27 mol/100 g)

Testing of performance characteristics

For the test, the dispersions or mixtures were mixed with chalk in a ratio of 1 : 1 (solid/solid) and then tested as floor adhesives.

Wet grip

The adhesive is applied with a DIN knife coater to a cement fiber board (Eternit®2000, 20×50 cm) in the peel direction in an amount of from about 350 to 400 g/m². After drying in the air for 10 minutes, needle felt coverings (NBB strips) are placed in the adhesive bed and pressed with a 2.5 kg roller by rolling forward and backward 3 times. The coverings are peeled off with a peeling apparatus in the stated time intervals, and the increase in the peel resistance N/5 cm is thus determined.

TABLE 3

| | Wet grip, values in N/5 cm | | |
|---|---|---|---|
| Example | after 10 min | after 20 min | after 30 min |
| D3 | 8 C | 20 C | 26 C |
| A3 | 18 C/AF | 30 AF | 24 AF |
| A4 | 20 C/AF | 25 AF | 25 AF |
| A5 | 12 C | 30 C | 36 C |
| D4 | 6 C | 15 C | 22 C/AF |
| A6 | 8 C | 18 AF | 20 AF |

TABLE 3-continued

| | Wet grip, values in N/5 cm | | |
|---|---|---|---|
| Example | after 10 min | after 20 min | after 30 min |
| A7 | 10 C | 25 C | 30 AF |
| A8 | 7 C | 28 C | 35 C/AF |

C = Loss of cohesion, AF = Loss of adhesion on floor side

Dry grip

The adhesive is applied with a DIN knife coater to a cement fiber board (Eternit®2000, 20×50 cm) in the peeling direction in an amount of from about 250 to 300 g/m². After various running times in the air, PVC strips (Pegulan®B1) are placed in the adhesive bed and pressed with a 2.5 kg roller by rolling forward and backward 3 times. Thereafter, the strips are peeled off with a peeling apparatus, and the peel resistance is determined in N/5 cm.

TABLE 4

| | Dry grip, values in N/5 cm | | |
|---|---|---|---|
| Example | after 10 min | after 20 min | after 30 min |
| D1 | 3 C | 12 C | 30 C |
| A1 | 2 C | 25 C | 37 C |
| D2 | 2 C | 20 C | 38 C |
| A2 | 2 C | 15 C | 30 C |
| D3 | 8 C | 6 A/PVC | 6 A/PVC |
| A3 | 2 C/AF | 10 AF | 20 A/PVC |
| A4 | 0 C | 14 C/AF | 25 A/PVC |
| A5 | 4 C | 14 A/PVC | 8 A/PVC |
| D4 | 8 C | 6 A/PVC | 6 A/PVC |
| A6 | 2 C | 23 C/AF | 28 A/PVC |
| A7 | 0 C | 20 C/AF | 25 A/PVC |
| A8 | 0 C | 20 C | 15 A/PVC |

C = Loss of cohesion, AF = Loss of adhesion on floor side, A/PVC = Loss of adhesion on PVC side

We claim:
1. A process for preparing an aqueous dispersion, said dispersion comprising a synthetic polymer obtained by free radical polymerization and a rosin, said process comprising:
   (i) mixing an aqueous dispersion of said synthetic polymer with an aqueous suspension of said rosin, wherein said rosin contains 0.1 to 0.5 mole of carboxyl groups per 100 g of rosin, and wherein said aqueous rosin suspension is free of organic solvents and plasticizers, and free of emulsifiers, dispersants, protective colloids, and other assistants capable of dispersing or emulsifying said rosin.

2. The process of claim 1, wherein a neutralizing agent is added before or during said mixing so that some or all of the carboxyl groups of said rosin are present as carboxylate groups.

3. The process of claim 1, wherein the temperature of said aqueous suspension of said rosin is above the melting point of the rosin, during said mixture.

4. The process of claim 1, wherein said aqueous dispersion of said synthetic polymer and said rosin has a solids content greater than 60% by weight.

5. The process of claim 1, wherein said synthetic polymer is obtained by free radical polymerization of a monomer mixture comprising at least 60% by weight of a monomer selected from the group consisting of $C_1$–$C_{20}$-alkyl (meth)acrylates, vinyl esters of carboxylic acids of up to 20 carbon atoms, vinyl aromatics of up to 20 carbon atoms, ethylenically unsaturated nitriles of 3 to 6 carbon atoms, vinyl halides and nonaromatic hydrocarbons having at least 2 conjugated double bonds and 4 to 8 carbon atoms, and mixtures thereof.

6. The process of claim 1, wherein said synthetic polymer is obtained by free radical polymerization of a monomer mixture comprising from 0.1 to 5% by weight of monomers having a salt-forming group.

7. An aqueous dispersion comprising a synthetic polymer obtained by free radical polymerization and a rosin, wherein said dispersion is prepared by a process comprising:
   (i) mixing an aqueous dispersion of said synthetic polymer with an aqueous suspension of said rosin, wherein said rosin contains 0.1 to 0.5 mole of carboxyl groups per 100 g of rosin, and wherein said aqueous dispersion comprising said synthetic polymer and said rosin is free of organic solvents and plasticizers, and free of emulsifiers, dispersants, protective colloids, and other assistants capable of dispersing or emulsifying said rosin.

8. An aqueous dispersion comprising a synthetic polymer obtained by free radical polymerization and a rosin obtained from a suspension thereof, wherein said rosin contains 0.1 to 0.5 mole of carboxyl groups per 100 g of rosin, and wherein said aqueous dispersion is free of organic solvents and plasticizers, and free of emulsifiers, dispersants, protective colloids, and other assistants capable of dispersing or emulsifying said rosin.

9. A method of adhering a first article to a second article, comprising applying an adhesive to said first article to form an adhesive layer and contacting said second article with said adhesive layer, wherein said adhesive is an aqueous dispersion comprising a synthetic polymer obtained by free radical polymerization and a rosin, wherein said dispersion is prepared by a process comprising:
   (i) mixing an aqueous dispersion of said synthetic polymer with an aqueous suspension of said rosin, wherein said rosin contains 0.1 to 0.5 mole of carboxyl groups per 100 g of rosin, and wherein said aqueous dispersion comprising said synthetic polymer and said rosin is free of organic solvents and plasticizers, and free of emulsifiers, dispersants, protective colloids, and other assistants capable of dispersing or emulsifying said rosin.

10. A method of adhering a first article to a second article, comprising applying an adhesive to said first article to form an adhesive layer and contacting said second article with said adhesive layer, wherein said adhesive is an aqueous dispersion comprising a synthetic polymer obtained by free radical polymerization and a rosin obtained from a suspension thereof, wherein said rosin contains 0.1 to 0.5 mole of carboxyl groups per 100 g of rosin, and wherein said aqueous dispersion comprising said synthetic polymer and said rosin is free of organic solvents and plasticizers, and free of emulsifiers, dispersants, protective colloids, and other assistants capable of dispersing or emulsifying said rosin.

11. The method of claim 10, wherein said first and second articles are floor components.

* * * * *